(12) United States Patent
Palmer et al.

(10) Patent No.: US 11,176,111 B2
(45) Date of Patent: Nov. 16, 2021

(54) DISTRIBUTED DATABASE MANAGEMENT SYSTEM WITH DYNAMICALLY SPLIT B-TREE INDEXES

(71) Applicant: NuoDB, INC., Cambridge, MA (US)

(72) Inventors: Trek S. Palmer, Cambridge, MA (US); James A. Starkey, Manchester, MA (US)

(73) Assignee: NuoDB, Inc., Cambridge, MA (US)

( * ) Notice: Subject to any disclaimer, the term of this patent is extended or adjusted under 35 U.S.C. 154(b) by 207 days.

(21) Appl. No.: 16/129,661

(22) Filed: Sep. 12, 2018

(65) Prior Publication Data

US 2019/0278757 A1  Sep. 12, 2019

Related U.S. Application Data

(63) Continuation of application No. 14/215,401, filed on Mar. 17, 2014, now abandoned.

(60) Provisional application No. 61/789,479, filed on Mar. 15, 2013.

(51) Int. Cl.
*G06F 16/22* (2019.01)
*G06F 16/23* (2019.01)

(52) U.S. Cl.
CPC ...... *G06F 16/2246* (2019.01); *G06F 16/2379* (2019.01)

(58) Field of Classification Search
CPC .............. G06F 16/2246; G06F 16/2379
See application file for complete search history.

(56) References Cited

U.S. PATENT DOCUMENTS

| | | | |
|---|---|---|---|
| 4,853,843 A | 8/1989 | Ecklund | |
| 5,446,887 A | 8/1995 | Berkowitz | |
| 5,524,240 A | 6/1996 | Barbara et al. | |
| 5,555,404 A | 9/1996 | Torbjønsen et al. | |
| 5,568,638 A | 10/1996 | Hayashi et al. | |
| 5,625,815 A * | 4/1997 | Maier | G06F 16/284 |

(Continued)

FOREIGN PATENT DOCUMENTS

| CN | 101251843 B | 6/2010 |
|---|---|---|
| CN | 101471845 B | 6/2011 |

(Continued)

OTHER PUBLICATIONS

"Album Closing Policy," Background, retrieved from the Internet at URL:http://tools/wiki/display/ENG/Album+Closing+Policy (Jan. 29, 2015), 4 pp.

(Continued)

*Primary Examiner* — Neveen Abel Jalil
*Assistant Examiner* — Hubert Cheung
(74) *Attorney, Agent, or Firm* — Smith Baluch LLP

(57) ABSTRACT

A distributed data processing system for a database composed of data records organized into tables for responding to a request to split an index in a consistent and concurrent fashion. A request to split an index atom at any given node is processed by a designated "chairman" for that index atom. The chairman splits its index by maintaining a lower portion thereof and by moving the contents of an upper portion to a newly created index atom as the right sibling. Each other node takes appropriate steps to assure orderly transfer of this information from the chairman consistently and concurrently across the distributed database processing system.

17 Claims, 11 Drawing Sheets

(56) References Cited

U.S. PATENT DOCUMENTS

| | | | |
|---|---|---|---|
| 5,701,467 A | 11/1997 | Freeston | |
| 5,764,877 A | 6/1998 | Lomet et al. | |
| 5,806,065 A * | 9/1998 | Lomet | G06F 16/2246 |
| | | | 707/610 |
| 5,960,194 A | 9/1999 | Choy et al. | |
| 6,216,151 B1 | 4/2001 | Antoun | |
| 6,226,650 B1 | 5/2001 | Mahajan et al. | |
| 6,275,863 B1 | 8/2001 | Leff et al. | |
| 6,334,125 B1 | 11/2001 | Johnson et al. | |
| 6,401,096 B1 | 6/2002 | Zellweger | |
| 6,424,967 B1 | 7/2002 | Johnson et al. | |
| 6,480,857 B1 | 11/2002 | Chandler | |
| 6,499,036 B1 | 12/2002 | Gurevich | |
| 6,523,036 B1 | 2/2003 | Hickman et al. | |
| 6,748,394 B2 | 6/2004 | Shah et al. | |
| 6,792,432 B1 | 9/2004 | Kodavalla et al. | |
| 6,862,589 B2 | 3/2005 | Grant | |
| 7,026,043 B2 | 4/2006 | Bleizeffer et al. | |
| 7,080,083 B2 | 7/2006 | Kim et al. | |
| 7,096,216 B2 | 8/2006 | Anonsen | |
| 7,184,421 B1 * | 2/2007 | Liu | H04L 12/189 |
| | | | 370/254 |
| 7,219,102 B2 | 5/2007 | Zhou et al. | |
| 7,233,960 B1 | 6/2007 | Boris et al. | |
| 7,293,039 B1 | 11/2007 | Deshmukh et al. | |
| 7,353,227 B2 | 4/2008 | Wu | |
| 7,395,352 B1 | 7/2008 | Lam et al. | |
| 7,401,094 B1 | 7/2008 | Kesler | |
| 7,403,948 B2 | 7/2008 | Ghoneimy et al. | |
| 7,562,102 B1 | 7/2009 | Sumner et al. | |
| 7,853,624 B2 | 12/2010 | Friedlander et al. | |
| 7,890,508 B2 | 2/2011 | Gerber et al. | |
| 8,108,343 B2 | 1/2012 | Wang et al. | |
| 8,122,201 B1 * | 2/2012 | Marshak | G06F 11/1443 |
| | | | 711/154 |
| 8,224,860 B2 | 7/2012 | Starkey | |
| 8,266,122 B1 | 9/2012 | Newcombe et al. | |
| 8,504,523 B2 | 8/2013 | Starkey | |
| 8,756,237 B2 | 6/2014 | Stillerman et al. | |
| 8,930,312 B1 | 1/2015 | Rath et al. | |
| 9,501,363 B1 | 11/2016 | Ottavio | |
| 9,734,021 B1 | 8/2017 | Sanocki et al. | |
| 9,824,095 B1 | 11/2017 | Taylor et al. | |
| 2002/0112054 A1 | 8/2002 | Hatanaka | |
| 2002/0152261 A1 | 10/2002 | Arkin et al. | |
| 2002/0152262 A1 | 10/2002 | Arkin et al. | |
| 2002/0178162 A1 | 11/2002 | Ulrich et al. | |
| 2003/0051021 A1 | 3/2003 | Hirschfeld et al. | |
| 2003/0149709 A1 | 8/2003 | Banks | |
| 2003/0204486 A1 | 10/2003 | Berks et al. | |
| 2003/0220935 A1 | 11/2003 | Vivian et al. | |
| 2004/0153459 A1 | 8/2004 | Whitten | |
| 2004/0263644 A1 | 12/2004 | Ebi | |
| 2005/0013208 A1 | 1/2005 | Hirabayashi et al. | |
| 2005/0086384 A1 | 4/2005 | Ernst | |
| 2005/0198062 A1 | 9/2005 | Shapiro | |
| 2005/0216502 A1 | 9/2005 | Kaura et al. | |
| 2006/0010130 A1 | 1/2006 | Leff et al. | |
| 2006/0168154 A1 * | 7/2006 | Zhang | G06F 11/1662 |
| | | | 709/220 |
| 2007/0067349 A1 | 3/2007 | Jhaveri et al. | |
| 2007/0156842 A1 | 7/2007 | Vermeulen et al. | |
| 2007/0288526 A1 * | 12/2007 | Mankad | G06F 11/1662 |
| 2008/0086470 A1 | 4/2008 | Graefe | |
| 2008/0106548 A1 * | 5/2008 | Singer | G06T 17/005 |
| | | | 345/421 |
| 2008/0228795 A1 * | 9/2008 | Lomet | G06F 16/2477 |
| 2008/0320038 A1 | 12/2008 | Liege | |
| 2009/0113431 A1 | 4/2009 | Whyte | |
| 2010/0094802 A1 | 4/2010 | Luotojarvi et al. | |
| 2010/0115246 A1 | 5/2010 | Seshadri et al. | |
| 2010/0153349 A1 | 6/2010 | Schroth | |
| 2010/0191884 A1 | 7/2010 | Holenstein et al. | |
| 2010/0235606 A1 | 9/2010 | Oreland et al. | |
| 2010/0297565 A1 | 11/2010 | Waters et al. | |
| 2011/0087874 A1 | 4/2011 | Timashev et al. | |
| 2011/0231447 A1 * | 9/2011 | Starkey | G06F 16/27 |
| | | | 707/792 |
| 2012/0254175 A1 | 4/2012 | Horowitz et al. | |
| 2012/0136904 A1 | 5/2012 | Ravi | |
| 2013/0060922 A1 | 3/2013 | Koponen et al. | |
| 2013/0086018 A1 | 4/2013 | Horii | |
| 2013/0110766 A1 | 5/2013 | Promhouse et al. | |
| 2013/0110774 A1 | 5/2013 | Shah et al. | |
| 2013/0110781 A1 | 5/2013 | Golab et al. | |
| 2013/0159265 A1 | 6/2013 | Peh et al. | |
| 2013/0159366 A1 | 6/2013 | Lyle et al. | |
| 2013/0232378 A1 | 9/2013 | Resch et al. | |
| 2013/0262403 A1 | 10/2013 | Milousheff et al. | |
| 2013/0278412 A1 | 10/2013 | Kelly et al. | |
| 2013/0311426 A1 | 11/2013 | Erdogan et al. | |
| 2014/0108414 A1 | 4/2014 | Stillerman et al. | |
| 2014/0279881 A1 | 9/2014 | Tan et al. | |
| 2014/0297676 A1 | 10/2014 | Bhatia et al. | |
| 2014/0304306 A1 | 10/2014 | Proctor | |
| 2015/0019739 A1 | 1/2015 | Attaluri et al. | |
| 2015/0032695 A1 | 1/2015 | Tran et al. | |
| 2015/0066858 A1 | 3/2015 | Sabdar et al. | |
| 2015/0135255 A1 | 5/2015 | Theimer et al. | |
| 2015/0370505 A1 | 12/2015 | Shuma et al. | |
| 2016/0134490 A1 | 5/2016 | Balasubramanyan et al. | |
| 2016/0306709 A1 | 10/2016 | Shaull | |
| 2016/0350357 A1 | 12/2016 | Palmer | |
| 2016/0350392 A1 | 12/2016 | Rice | |
| 2016/0371355 A1 | 12/2016 | Massari | |
| 2017/0039099 A1 | 2/2017 | Ottavio | |
| 2017/0139910 A1 | 5/2017 | Mcalister et al. | |

FOREIGN PATENT DOCUMENTS

| | | |
|---|---|---|
| CN | 101268439 B | 4/2012 |
| EA | 002931 B1 | 10/2001 |
| EP | 1403782 A2 | 3/2004 |
| JP | 2006-048507 | 2/2006 |
| JP | 2007-058275 | 3/2007 |
| JP | 2003-256256 | 3/2013 |
| RU | 2315349 C1 | 1/2008 |
| RU | 2008106904 A | 8/2009 |

OTHER PUBLICATIONS

"Distributed Coordination in NuoDB," YouTube, retrieved from the Internet at URL:https://www.youtube.com/watch?feature=player_embedded&v=URoeHvflVKg on Feb. 4, 2015, 2 pp.

"Glossary—NuoDB 2.1 Documentation / NuoDB," retrieved from the Internet at URL: http://doc.nuodb.com/display/doc/Glossary on Feb. 4, 2015, 1 pp.

"How It Works," retrieved from the Internet at URL: http://www.nuodb.com/explore/newsql-cloud-database-how-it-works?mkt_tok=3RkMMJW on Feb. 4, 2015, 4 pp.

"How to Eliminate MySQL Performance Issues," NuoDB Technical Whitepaper, Sep. 10, 2014, Version 1, 11 pp.

"Hybrid Transaction and Analytical Processing with NuoDB," NuoDB Technical Whitepaper, Nov. 5, 2014, Version 1, 13 pp.

"No Knobs Administration," retrieved from the Internet at URL: http://www.nuodb.com/explore/newsql-cloud-database-product/auto-administration on Feb. 4, 2015, 4 pp.

"Snapshot Albums," Transaction Ordering, retrieved from the Internet at URL:http://tools/wiki/display/ENG/Snapshot+Albums (Aug. 12, 2014), 4 pp.

"Table Partitioning and Storage Groups (TPSG)," Architect's Overview, NuoDB Technical Design Document, Version 2.0 (2014), 12 pp.

"The Architecture & Motivation for NuoDB," NuoDB Technical Whitepaper, Oct. 5, 2014, Version 1, 27 pp.

"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.

"What Is A Distributed Database? And Why Do You Need One," NuoDB Technical Whitepaper, Jan. 23, 2014, Version 1, 9 pp.

(56) References Cited

OTHER PUBLICATIONS

Advisory Action issued by The United States Patent and Trademark Office for U.S. Appl. No. 14/215,461, dated Jan. 10, 2017, 9 pages.
Advisory Action dated May 2, 2018 for U.S. Appl. No. 14/215,461, 8 pages.
Amazon CloudWatch Developer Guide API, Create Alarms That or Terminate an Instance, Jan. 2013, downloaded Nov. 16, 2016 from archive.org., pp. 1-11.
Amazon RDS FAQs, Oct. 4, 2012, downloaded Nov. 16, 2016 from archive.org., 39 pp.
Bergsten et al., "Overview of Parallel Architectures for Databases," The Computer Journal vol. 36, No. 8, pp. 734-740 (1993).
Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.
Dan et al., "Performance Comparisons of Buffer Coherency Policies," Proceedings of the International Conference on Distributed Computer Systems, IEEE Comp. Soc. Press vol. 11, pp. 208-217 (1991).
Decision to Grant dated Nov. 14, 2016 from Belarus Patent Application No. a20121441 with English Translation, 15 pp.
Durable Distributed Cache Architecture, retrieved from the Internet at URL: http://www.nuodb.com/explore/newsql-cloud-database-ddc-architecture on Feb. 4, 2015, 3 pp.
Final Office Action dated Jan. 10, 2018 from U.S. Appl. No. 14/215,461, 30 pages.
Final Office Action dated Sep. 9, 2016 from U.S. Appl. No. 14/215,461, 26 pp.
Final Office Action dated Nov. 3, 2016 from U.S. Appl. No. 14/215,401, 36 pp.
Final Office Action dated Nov. 7, 2017 from U.S. Appl. No. 14/247,364, 13 pages.
Final Office Action dated Nov. 24, 2017 from U.S. Appl. No. 14/215,401, 33 pages.
Final Office Action dated Dec. 13, 2016 from U.S. Appl. No. 14/247,364, 31 pp.
First Examination Report issued by the Canadian Intellectual Property Office for Application No. 2,793,429, dated Feb. 14, 2017, 3 pages.
Garding, P. "Alerting on Database Mirorring Events," Apr. 7, 2006, downloaded Dec. 6, 2016 from technet.microsoft.com, 24 pp.
Hull, Autoscaling Mysql On Amazon EC2, Apr. 9, 2012, 7 pages.
International Preliminary Report on Patentability dated Oct. 13, 2015 from PCT/US2014/033270, 4 pp.
International Search Report and Written Opinion dated Oct. 28, 2016 from PCT/US16/34651,16 pp.
International Search Report and Written Opinion dated Aug. 21, 2014 from PCT/US2014/033270, 5 pp.
International Search Report and Written Opinion dated Jul. 15, 2016 from PCT/US2016/27658, 37 pp.
International Search Report and Written Opinion dated Sep. 8, 2016 from PCT/US16/37977, 11 pp.
International Search Report and Written Opinion dated Sep. 9, 2016 from PCT/US16/34646, 12 pp.
International Search Report dated Sep. 26, 2012 from PCT/US2011/029056, 4 pp.
Iqbal, A. M. et al., "Performance Tradeoffs in Static and Dynamic Load Balancing Strategies," Instittute for Computer Applications in Science and Engineering, 1986, pp. 1-23.

Leverenz et al., "Oracle8i Concepts, Partitioned Tables and Indexes," Chapter 11, pp. 11-12-11/66 (1999).
Non-Final Office Action dated Jan. 21, 2016 from U.S. Appl. No. 14/215,401, 19 pp.
Non-Final Office Action dated Feb. 1, 2016 from U.S. Appl. No. 14/215,461, 19 pp.
Non-Final Office Action dated Feb. 6, 2014 from U.S. Appl. No. 13/933,483, 14 pp.
Non-Final Office Action dated Apr. 12, 2017 from U.S. Appl. No. 14/247,364, 12 pp.
Non-Final Office Action dated May 19, 2016 from U.S. Appl. No. 14/247,364, 24 pp.
Non-Final Office Action dated May 31, 2017 from U.S. Appl. No. 14/215,401, 27 pp.
Non-Final Office Action dated Jun. 1, 2017 from U.S. Appl. No. 14/215,461, 21 pp.
Non-Final Office Action dated Jun. 2, 2017 from U.S. Appl. No. 14/744,546, 25 pp.
Non-Final Office Action dated Sep. 19, 2017 from U.S. Appl. No. 14/726,200, 37 pages.
Non-Final Office Action dated Sep. 21, 2017 from U.S. Appl. No. 14/688,396, 31 pages.
Non-Final Office Action dated Sep. 23, 2016 from U.S. Appl. No. 14/616,713, 8 pp.
Non-Final Office Action dated Oct. 10, 2012 from U.S. Appl. No. 13/525,953, 8 pp.
Notice of Allowance dated Feb. 29, 2012 from U.S. Appl. No. 13/051,750, 8 pp.
Notice of Allowance dated Apr. 1, 2013 from U.S. Appl. No. 13/525,953, 10 pp.
Notice of Allowance dated May 14, 2012 from U.S. Appl. No. 13/051,750, 8 pp.
Notice of Allowance dated Jul. 27, 2016 from U.S. Appl. No. 14/215,372, 12 pp.
NuoDB at a Glance, retrieved from the Internet at URL: http://doc.nuodb.com/display/doc/NuoDB+at+a+Glance on Feb. 4, 2015, 1 pp.
Oracle Database Concepts 10g Release 2 (10.2), Oct. 2005, 14 pages.
Rahimi, S. K. et al., "Distributed Database Management Systems: A Practical Approach," IEEE Computer Society, John Wiley & Sons, Inc. Publications (2010), 765 pp.
Roy, N. et al., "Efficient Autoscaling in the Cloud using Predictive Models for Workload Forecasting," *IEEE* 4th International Conference on Cloud Computing, 2011, pp. 500-507.
Searchcloudapplications.techtarget.com, Autoscaling Definition, Aug. 2012, 1 page.
Shaull, R. et al., "A Modular and Efficient Past State System for Berkeley DB," Proceedings of USENIX ATC '14:2014 USENIX Annual Technical Conference, 13 pp. (Jun. 19-20, 2014).
Shaull, R. et al., "Skippy: a New Snapshot Indexing Method for Time Travel in the Storage Manager," SIGMOD'08, Jun. 9-12, 2008, 12 pp.
Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.
Veerman, G et al., "Database Load Balancing, MySQL 5.5 vs PostgreSQL 9.1," Universiteit van Amsterdam, System & Network Engineering, Apr. 2, 2012, 51 pp.
Yousif, M. "Shared-Storage Clusters," Cluster Computing, Baltzer Science Publishers, Bussum, NL, vol. 2, No. 4, pp. 249-257 (1999).

\* cited by examiner

INDEX ATOM 76

| 76A | INDEX ATOM ID |
|-----|---------------|
| 76B | POINTER TO MASTER CATALOG |
| 76C | POINTER TO CREATING CATALOG |
| 76D | POINTER TO CHAIRMAN |
| 76E | CHANGE NUMBER |
| 76F | LIST OF RELAYS |
| 76G | CYCLE REFERENCE |
| 76H | ACTIVE NODE LIST |
| 76I | STATUS STATES |
| 76J | BINARY TREE OF INDEX NODES |
| 76K | INDEX LEVEL |
| 76L | |
| 76M | |

FIG. 4

| MESSAGES | |
|---|---|
| 147 | INDEX SPLIT REQUEST |
| 148 | INDEX SPLIT |
| 150 | INDEX NODE ADDED |
| 160 | INDEX SPLIT START |
| 161 | INDEX SPLIT DONE |
| 162 | INDEX NODE REMOVED |

DISTRIBUTED DATABASE MANAGEMENT SYSTEM WITH DYNAMICALLY SPLIT B-TREE INDEXES

CROSS REFERENCE TO RELATED PATENT APPLICATIONS

U.S. Pat. No. 8,224,860 granted Jul. 17, 2012 for a Database Management System and assigned to the same assignee as this invention is incorporated in its entirety herein by reference.

This application is a continuation of U.S. application Ser. No. 14/215,401 filed Mar. 17, 2014, for a Distributed Database Management System with Dynamically Split B-Tree Indexes, which in turn claims priority from U.S. Provisional Application Ser. No. 61/789,479 filed Mar. 15, 2013 for a Distributed Database Management System with Dynamically Split B-Tree Indexes. Each of these applications is incorporated in its entirety herein by reference.

BACKGROUND OF THE INVENTION

Field of the Invention

This invention generally relates to database management systems and more specifically to a methodology for splitting indexes in a distributed database management system.

Description of Related Art

Databases typically incorporate indexes for enabling the efficient retrieval of certain information. A B-tree data structure is a popular indexing structure that is optimized for use in databases that read and write large blocks of data and that enables efficient database searching. A B-Tree data structure includes a root and a plurality of leaves. The root uses a key value to identify a corresponding leaf. Each leaf points to any records that contain the key value. The key values are sorted in order, typically in a plurality of leaves thereby to form a sorted list. Specifically, a given leaf includes a "left sibling" and a "right sibling" that identify a leaf to the left of and a leaf to right of the given leaf thereby to maintain a list in sorted order. The first or left-most leaf and last or right-most leaf include entries denoting the ends of the list of leafs for that root.

Typically each leaf has a fixed memory size. When a size threshold is reached, it becomes necessary to define a key value and to "split" that leaf into "left" and "right" leafs. The "left" leaf receives values that are less than the defined key value and the "right" leaf receives the remaining values with appropriate modifications to the root. In centrally based and non-shared databases, the splitting process is efficient because generally there is only one copy of the index in the database system. The split is easy to effect by quiescing the data processing system during the actual splitting operation.

Recently there has been interest in the development of distributed databases. The above-identified U.S. Pat. No. 8,224,860 discloses an implementation of a distributed database wherein user access is provided through a network of transactional nodes and complete copies of the information in the database are only stored on archival nodes that act as storage managers and are not directly accessed by users. More specifically, a user connects to a transactional node to perform operations on the database by generating high-level queries that the transactional node processes. In this implementation a given transactional node need only contain that data and metadata as required to process queries from users connected to that node. The data and metadata are defined by an array of atom classes, such as an index class, and atoms where each atom corresponds to a different instance of the class, such as index atom for a specific index. Replications or copies of an atom may reside in multiple nodes wherein the atom copy and a given node are processed in that node at least in part independently of each other. When an atom is created at a node, it is designated as a "chairman." The designation of a node as a chairman can be transferred to a replication of that atom in another node.

In the implementation of U.S. Pat. No. 8,224,860 asynchronous messages transfer atoms and information about atoms among the different nodes to maintain the database in a consistent and a concurrent state. Specifically each node in the database network has a unique communications path to every other node. When one node generates a message involving a specific atom, it can communicate as necessary with those other nodes that contain replications of that specific atom. Each node generates these messages independently of other nodes. So it is possible that, at any given instant, multiple nodes will contain copies of a given atom and different nodes may be at various stages of processing them. As these operations in different nodes normally are not synchronized, it is necessary to operate the database so each user is assured that interaction is with a concurrent and consistent database.

Splitting an index in a distributed database such as disclosed in the above-identified U.S. Pat. No. 8,224,860 involves splitting replications of an index atom that performs as a leaf at the transaction node requesting the split and each archival node plus any other transactional node that has a copy of that index atom. It is possible for multiple nodes to request a split of a given index whereupon a race problem can exist with an erroneous outcome. Prior methods, such as those involving quiescence, are not readily applicable to implementations of a distributed database of the type discussed above without introducing unacceptable system performance degradation. What is needed is a method for handling requests for splitting an index in a distributed database wherein copies of the index are located in multiple locations.

SUMMARY

Therefore it is an object of this invention to provide an implementation of a distributed database that processes requests to split an index in a consistent and concurrent fashion.

Another object of this invention is to provide an implementation of a distributed database that processes requests to split an index in consistent and concurrent fashion without any significant performance degradation.

Yet another object of this invention to provide an implementation of a distributed database that processes a requested split of an index and eliminates the involvement of nodes that do not include that specific index.

In accordance with one aspect of this invention a distributed database processing system includes a plurality of nodes, each of which includes means for establishing communications with every other node wherein the database has an atom class for each category of metadata and data including an index atom class that provides an index atom for each index in the database and each index atom includes a range of key values. An index atom can be replicated to other nodes. An index atom is split when a node detects a need to split the index atom based upon a split key value that defines lower and upper portions of the index. Another node identifies a location in its index atom based upon the key value for defining the approximate lower and upper portions of the keys for the index atom, creating a second index atom as a right sibling to the first index atom, transferring the key values in the upper portion of the first index atom to the to the lower portion of the second index atom and transmitting to all other nodes with the identified index atom an index split message including the split key value. Each other node responds to the receipt of the index split message by deleting corresponding to the key values in the upper portion of the first index atom being split, retrieving the populated second index atom copy from the one node with the right sibling and sending a split done message to the one node chairman whereupon the one node broadcasts an index split done message when all other nodes have generated the split done message.

In accordance with another aspect of this invention, a distributed database management system includes a plurality of transactional and archival nodes wherein each transactional node responds to queries by interacting with a portion of the database thereat and wherein an archival node stores a version of the entire database. Communications are established at each node and every other node. The system has an atom class for each category of metadata and data including an index atom class that provides a B-Tree index atom for each index in the database. Each index atom can be replicated on demand to the archival node and at least one transactional node. One index atom in one node is designated as a chairman for that index atom. The process of splitting an index atom includes detecting at one of the transactional nodes a need to split a B-Tree index at that node and, if the node does not contain the chairman, transmitting a split index request message to the chairman node including the identification of the requesting node and a split key value. The chairman responds to its internal request for splitting the index or the receipt of the split index request message from another node by defining the contents of lower and upper portions for the index in response to the split key value, creating a second index atom as a right sibling of the index atom being split, moving the upper portion of the index for that index atom to the second index atom, and transmitting to all nodes that contain that index atom, an index split message including the split key value that defines the split for the lower and upper portions. Each non-chairman node responds by deleting from its existing index atom in response to the split key value the contents in the upper portion of the index atom being split and retrieving from the chairman the populated second index atom copy as the right sibling for the index atom being split. Each node transmits a split done message to the chairman. The chairman sends an index split done message when all nodes involved in the index split operation have reported completion to the chairman.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 4 depicts the information of an index atom can be split in accordance with this invention;

FIGS. 8A through 8D, depicts a sequence of changes to an index being split in both a chairman and non-chairman node;

DESCRIPTION OF ILLUSTRATIVE EMBODIMENTS

Figure 1:
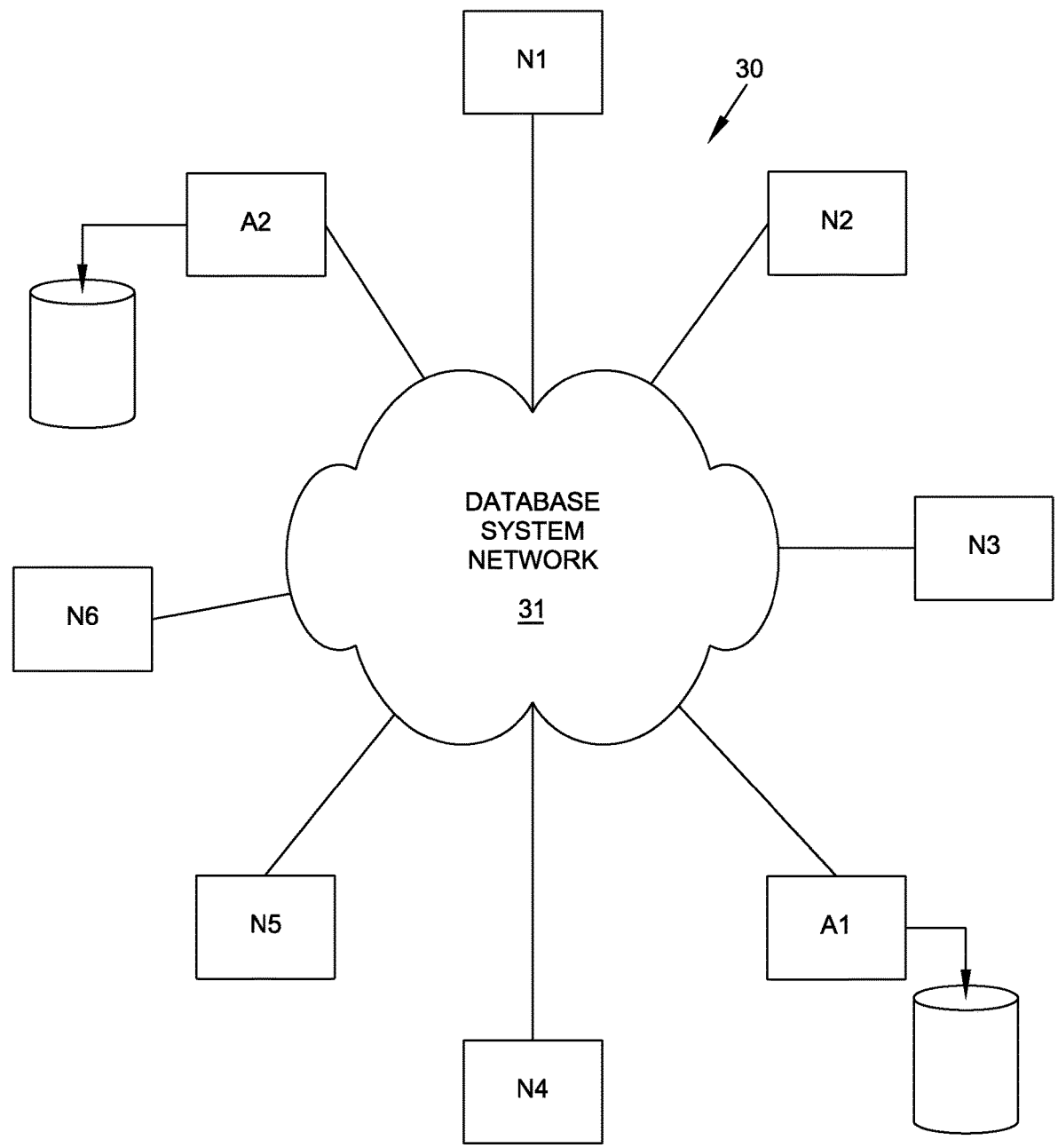
FIG. 1 is a diagram in schematic form of one implementation of an elastic, scalable, on-demand, distributed database to which this invention applies.

FIG. 1 depicts an implementation of an elastic, scalable, on-demand, distributed database system 30 that operates over a plurality of nodes. Nodes N1 through N6 are "transactional nodes" that provide user access to the database; nodes A1 and A2 are "archival nodes" that act as storage managers and function to maintain a disk archive of the entire database at each archival node. While an archival node normally stores the entire database, a single transactional node contains only that portion of the database it determines to be necessary to support transactions being performed at that node at that time.

Each node in FIG. 1 can communicate directly with each other node in the system 30 through a database system network 31. For example, node N1 can establish a communications path with each of nodes N2 through N6, A1 and A2. Communications between any two nodes is by way of serialized messages. In one embodiment, the messaging is performed in an asynchronous manner to maximize the bandwidth used by the system thereby to perform various operations in a timely and prompt manner. Typically, the database system network 31 will operate with a combination of high-bandwidth, low-latency paths (e.g., an Ethernet network) and high-bandwidth, high-latency paths (e.g., a WAN network). Each node has the capability to restrict use of a low-latency path to time-critical communications (e.g., fetching an atom). The high-latency path can be used for non-critical communications (e.g. a request to update information for a table). Also and preferably, the data processing network of this invention incorporates a messaging protocol, such as the Transmission Control Protocol (TCP) and assures that each node processes messages in the same sequence in which they were sent to it by other nodes.

Figure 2:
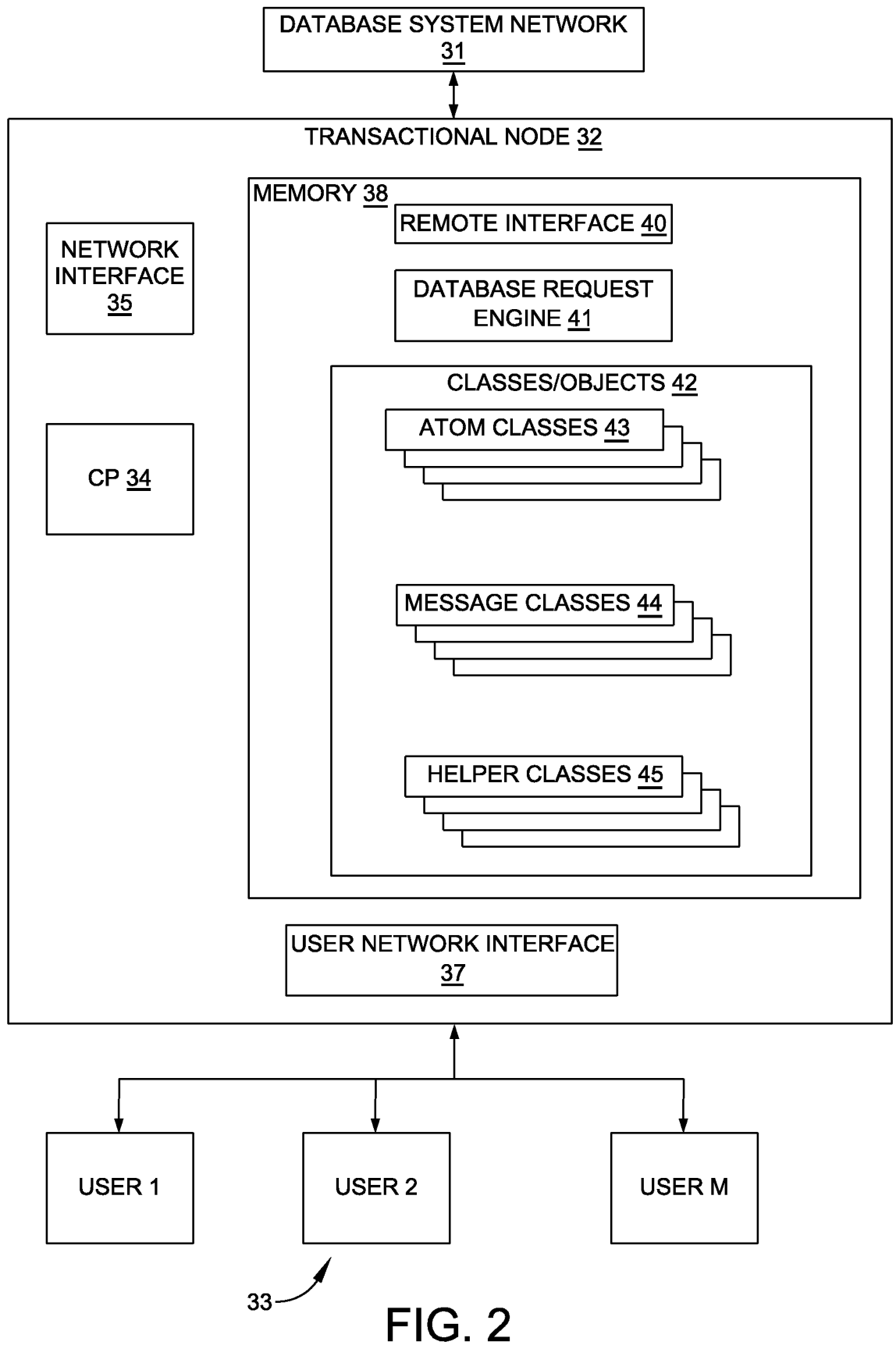
FIG. 2 depicts the organization of a transactional node.

FIG. 2 depicts a representative transactional node 32 that links to the database system network 31 and various end users 33. The transactional node 32 includes a central processing system (CP) 34 that communicates with the database system network 31 through a network interface 35 and with the various users through a user network interface 37. The central processing system 34 also interacts with RAM memory 38 that contains a copy of the database management program that implements this invention. This program functions to provide a remote interface 40, a database request engine 41 and a set 42 of classes or objects. The database request engine 41 only exists on transactional nodes and is the interface between the high-level input and output commands at the user level and system level input and output commands at the system level. In general terms, its database request engine parses, compiles and optimizes user queries such as SQL queries into commands that are interpreted by the various classes or objects in the set 42.

In this system, the classes/objects set 42 is divided into a subset 43 of "atom classes," a subset 44 of "message classes" and a subset 45 of "helper classes." At any given time a transactional node only contains those portions of the database that are then relevant to active user applications. Moreover, all portions of database in use at a given time at any transactional node are resident in random access memory 38. There is no need for providing supplementary storage, such as disk storage, at a transactional node during the operation of this system.

Figure 3A:
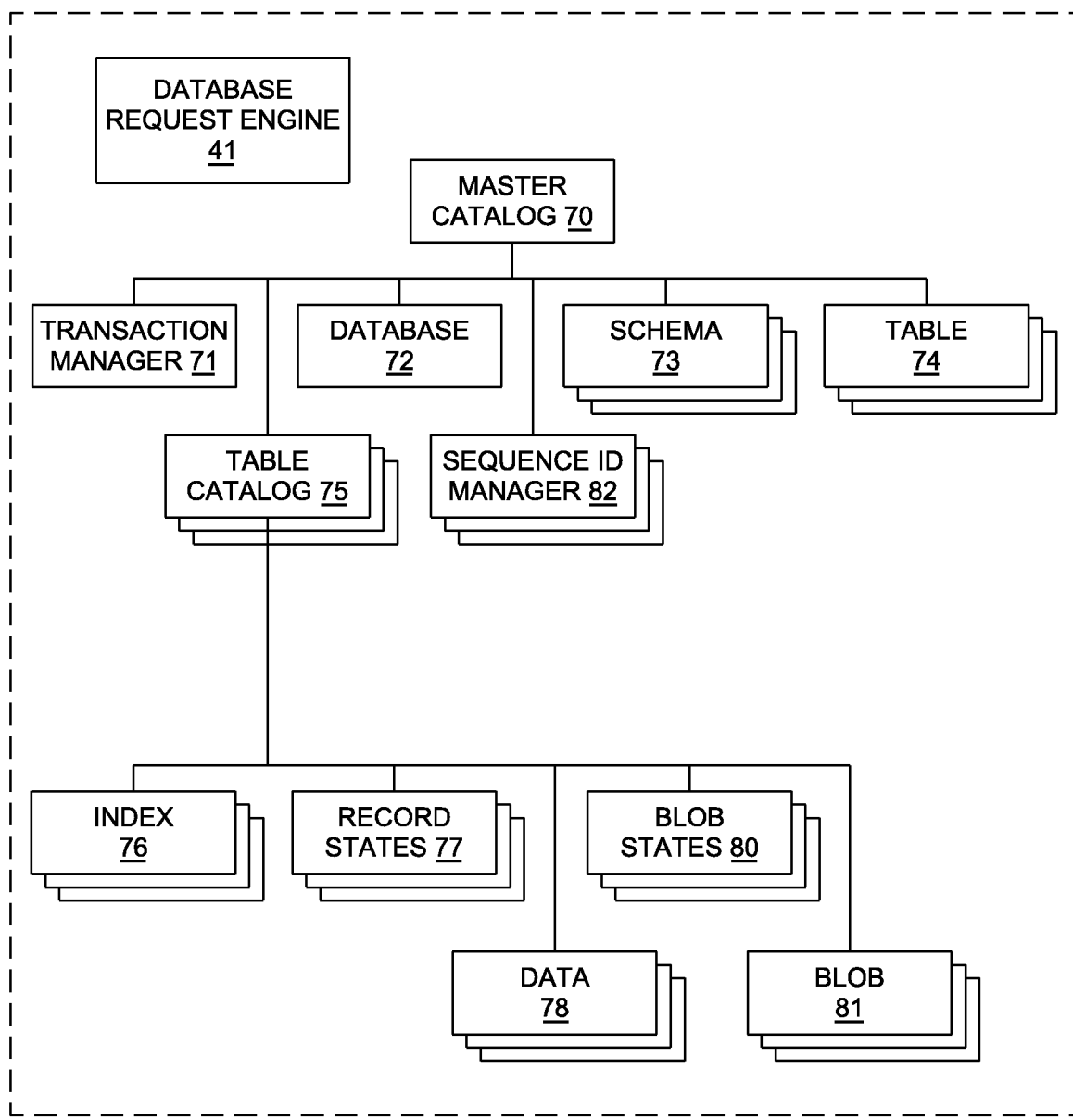
FIGS. 3A and 3B depict a local organization of "atom" objects generated by atom classes shown in FIG. 2 that might be present at any given time in any node.

Referring to FIG. 3A, a Master Catalog atom 70 tracks the status of transactional and archival nodes in database system 30 of FIG. 1. It also can be considered as an active index that creates and monitors the Transaction Manager atom 71, the Database atom 72, each Schema atom 73, each corresponding set of Table atoms 74 and Table Catalog atoms 75, and Sequence ID Managers 82. The Table Catalog atom 75 acts as an active index that creates and monitors Index atoms 76. Record States atoms 77. Data atoms 78, Blob States atoms 80 and Blob atoms 81 associated with a single table. There is one Table Catalog atom 75 for each table.

Figure 3B:
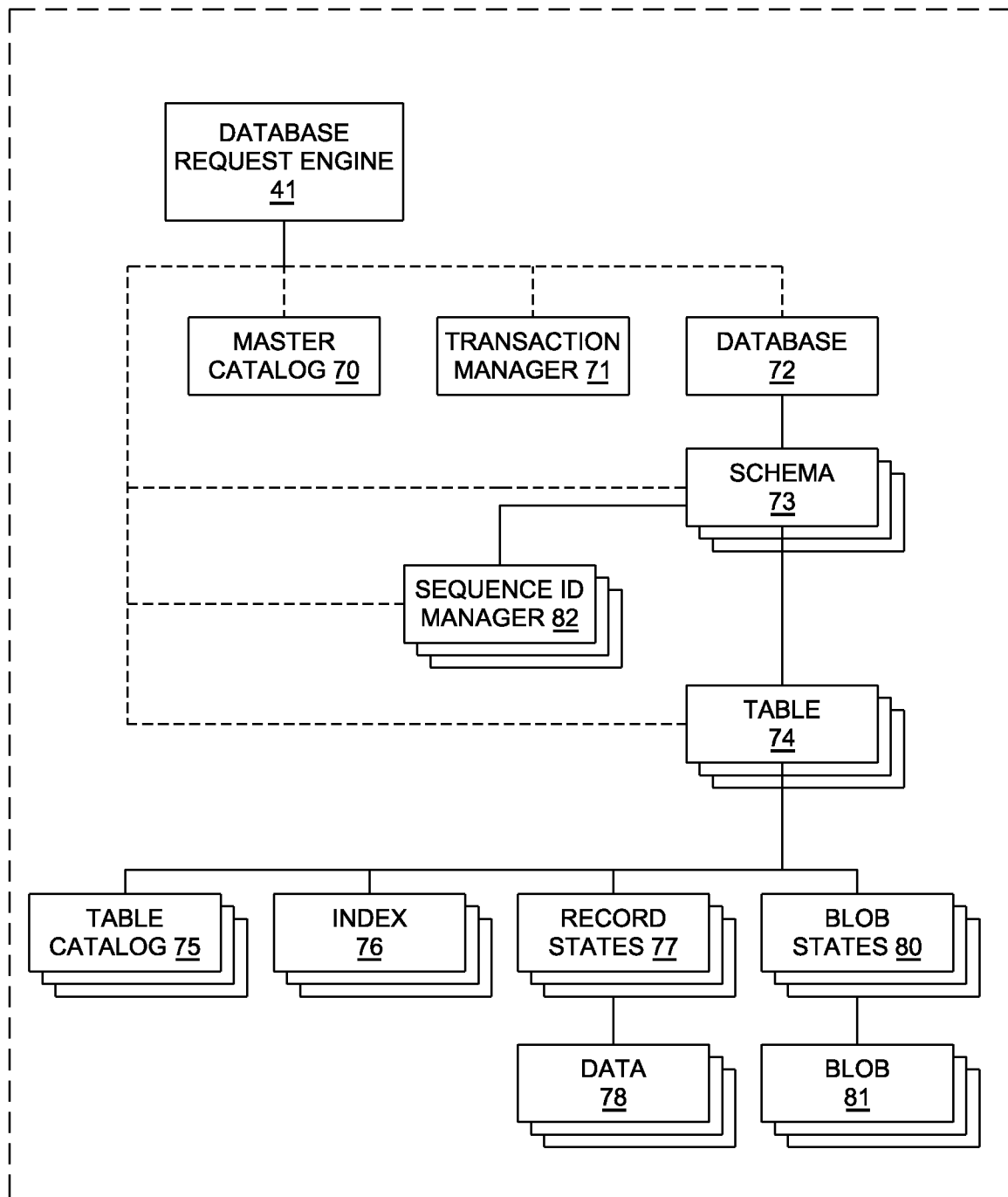

FIG. 3B is useful in understanding the interaction and management of different atom types. In this context, neither the Master Catalog atom 70 nor the Table Catalog atom 75 performs any management functions. With respect to the remaining atoms, the Database atom 72 manages each Schema atom 73. Each Schema atom 73 manages each related Table atom 74 and Sequence ID Manager atom 82. Each Table atom 74 manages its corresponding Table Catalog atom 75, Index atoms 76, Record States atoms 77. Data atoms 78, Blob States atom 80 and Blob atoms 81. Still referring to FIG. 3B, the database request engine 41 communicates with the Master Catalog atom 70, Transaction Manager atom 71, the Database atom 72, each Schema atom 73, each Table atom 74 and the Sequence ID Managers 82. The database request engine 41 acts as compiler for a high-level language such as SQL. As a compiler, it parses, compiles and optimizes queries and obtains metadata and data from atoms for the formation of the various fragments of data base information.

Each atom has certain common elements and other elements that are specific to its type. For purposes of describing this invention, FIG. 4 depicts an index atom 76 that is implemented as a B-Tree index and is split according to this invention. Element 76A is a unique identification for the index atom 76. Pointers 76B and 76C identify a master catalog atom and the creating catalog atom, respectively. Each atom must have a chairman that performs functions as described later. Element 76D points to the node where the chairman for that atom resides.

Each time a copy of an atom is changed in any transactional node, it receives a new change number. Element 76E records that change number. Whenever a node requests an atom from another node, there is an interval during which time the requesting node will not be known to other transactional nodes. Element 76F is a list of all the nodes to which the supplying node must relay messages that contain the atom until the request is completed.

Operations of the database system are also divided into cycles. A cycle reference element 76G provides the cycle number of the last access to the atom. Element 76H is a list of the all active nodes that contain the atom. Element 76I includes several status indicators. Elements 76 contains a binary tree of index nodes to provide a conventional indexing function. Element 76K contains an index level. Such index structures and operations are known to those in skilled in the art.

Figures 5, 6:
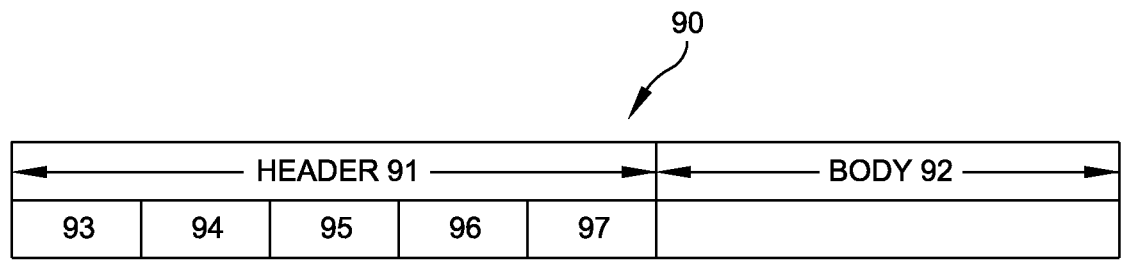
FIG. 5 depicts the syntax of an exemplary asynchronous message that transfers between transactional and archival nodes of FIG. 1.
FIG. 6 depicts messages that are useful in one implementation of this invention.

As previously indicated, communications between any two nodes is by way of serialized messages which are transmitted asynchronously using the TCP or another protocol with controls to maintain messaging sequences. FIG. 5 depicts the basic syntax of a typical message 90 that includes a variable-length header 91 and a variable-length body 92. The header 91 includes a message identifier code 93 that specifies the message and its function. As this invention envisions a scenario under which different nodes may operate with different software versions, the header 91 also includes identification 94 of the software version that created the message. The remaining elements in the header include a local identification 95 of the sender and information 96 for the destination of the message and atom identification 97. From this information, a recipient node can de-serialize, decode and process the message.

FIG. 6 depicts a set of messages that are helpful in implementing this invention. An Index Split Request message 147 is sent to the chairman by another (non-chairman) atom to institute an index split operation. An Index Split message 148 contains an index atom identifier and the key on which to split the index atom (i.e., a "split key"). An Index Split Start message 160 indicates that the chairman has begun processing the split and is broadcast to all nodes with a copy of the index being split. An Index Split Done message 161 indicates that a node has completed the split operation.

Figure 7:
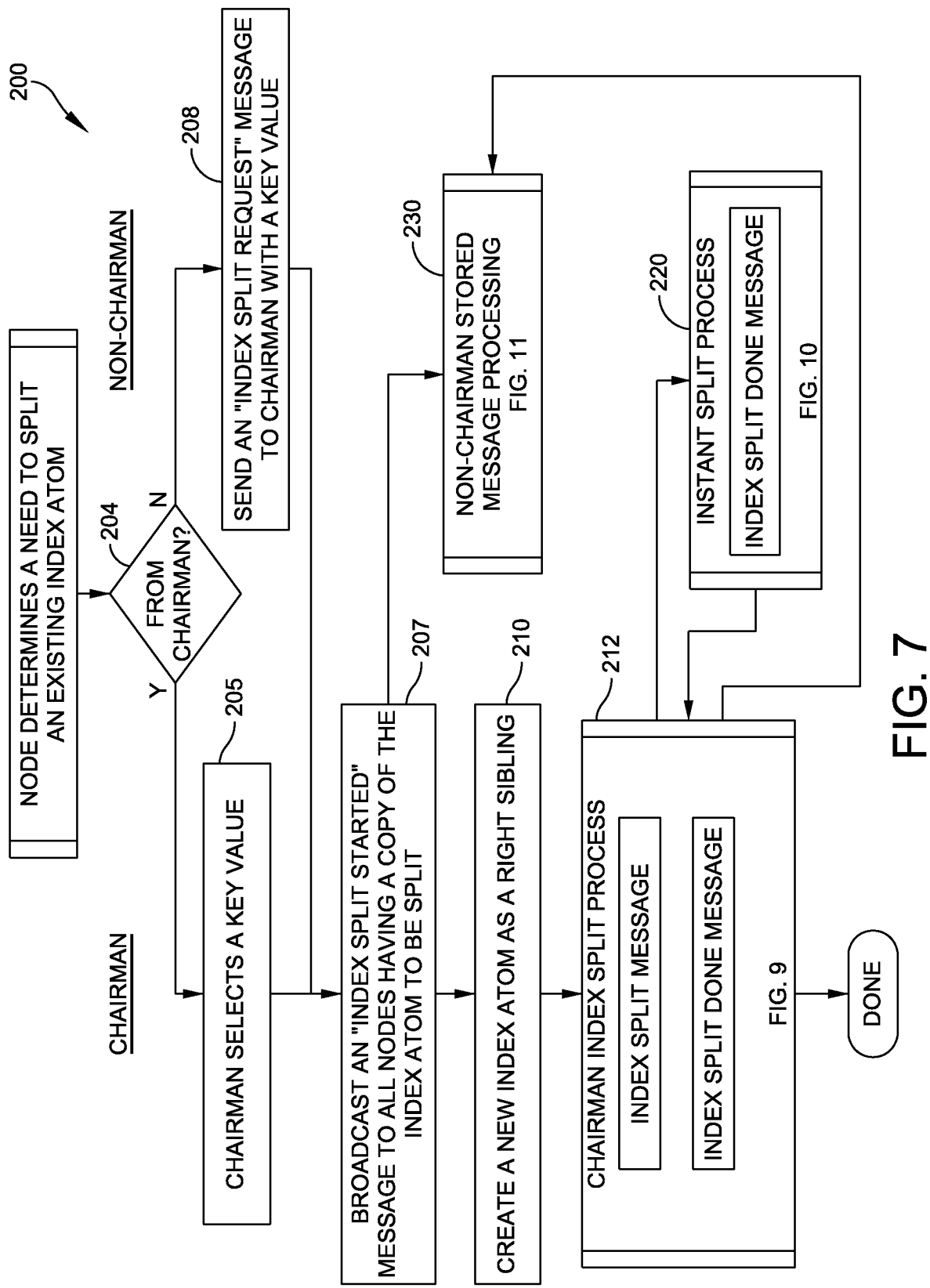
FIG. 7 is a flow diagram that is useful in understanding the response to a request for splitting an index atom in accordance with this invention.
Figure 8:
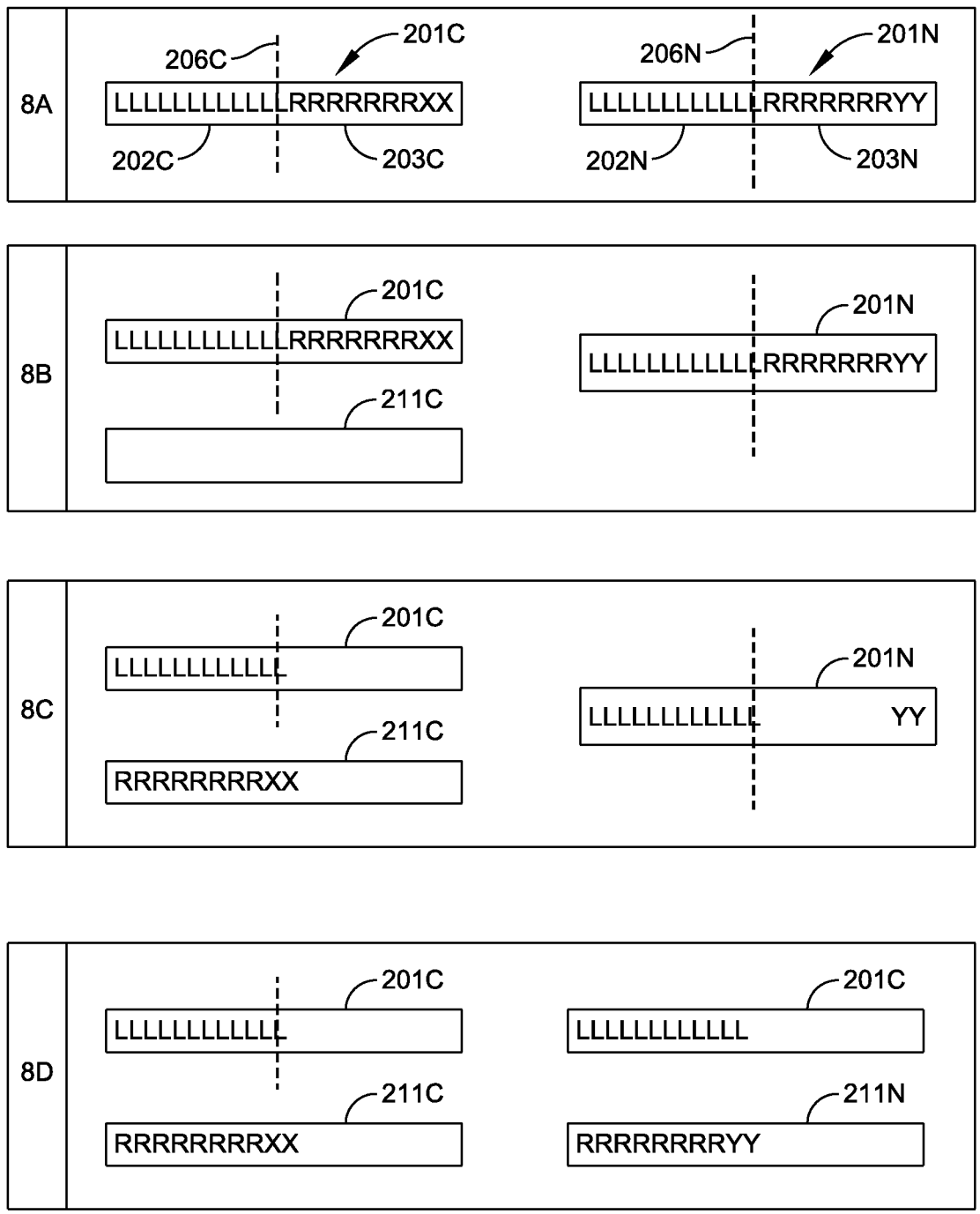
FIG. 8, comprising

FIG. 7 broadly discloses a process 200 for implementing an index splitting function in accordance with this invention. This disclosure can be better understood by referring to FIG. 8 in which FIGS. 8A through 8D depict the state of the index at various stages of the process as initiated by a non-chairman node. Specifically. FIG. 8A depicts an un-split index 201C where "C" designates an index atom located at the chairman's node. All other copies of the index atom are designated as 201N to indicate that they are located in a node that does not contain the chairman. FIG. 8A also discloses the index 201C at the chairman node as comprising a lower portion 202C and an upper portion 203C. Similarly, the index 201N in a non-chairman node comprises a lower portion 202N and an upper portion 203N.

If either the chairman or a non-chairman index node needs to be split, only the chairman controls the splitting operation. If the chairman determines that the atom 201C requires splitting, step 204 transfers control to step 205 whereupon the chairman selects a key value upon which to base the split. In FIG. 8 this value is represented by a vertical dashed line 206C and typically would be chosen so that a lower portion 202C and an upper portion 203C have approximately the same size. If the non-chairman determines that its index atom needs to be split, the non-chairman generates an Index Split Request message at step 208 with a split key value corresponding to a split position 206N. As will be apparent, either request is directed to step 207 whereupon the chairman takes control of the operation.

At step 207, the chairman broadcasts an Index Split Started message to all nodes having a copy of the index atom to be split. Each receiving node responds to the Index Split Started message by buffering and processing subsequent incoming messages in the nodes that include the index atom to be split. As the chairman now controls split, further operations will involve the index atom 201C.

Figure 9:
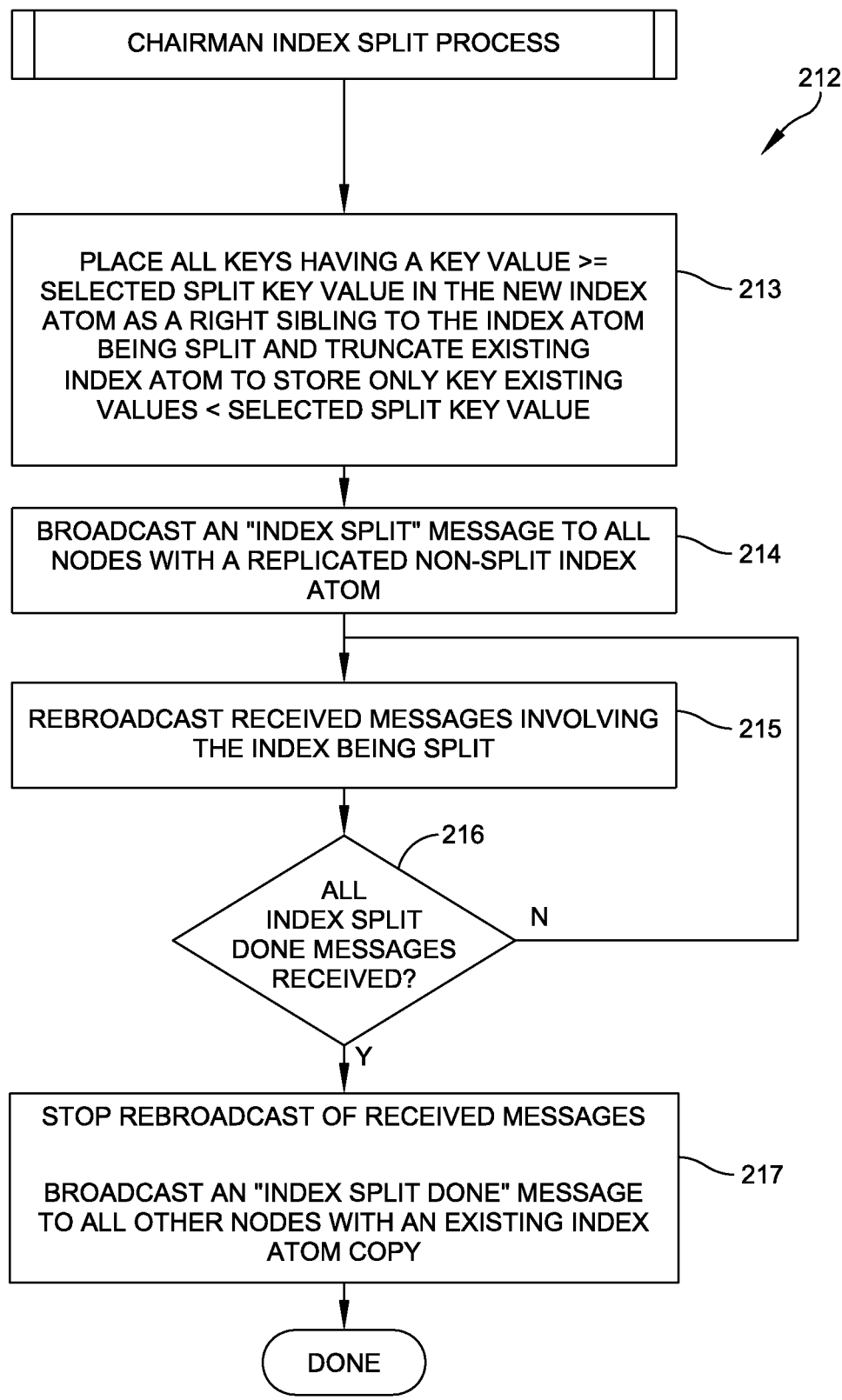
FIG. 9 depicts an index split process executed by the chairman.

Next, the chairman creates a new index atom at step 210 shown as an empty atom 211C in FIG. 8B. This new index atom then becomes the right sibling of the index atom being split by the chairman and the left sibling of the index atom that had been the right sibling prior to the split. Then the chairman transfers control to an index split process 212 to split the index as shown in FIG. 9 wherein the chairman uses step 213 to determine a key value of the index upon which to base the splitting operation; i.e., a split key value. As previously indicated, that value is established by the chairman or non-chairman that originates the request and defines a boundary in the index atom between the lower and upper key value ranges. The chairman uses this information to place all the keys in the upper key value portion into the new index atom and to truncate the original index by deleting the keys with values in the lower portion as shown in FIG. 8C.

In step 214 of FIG. 9 the chairman broadcasts an Index Split message to all other nodes that contain an existing index atom including the chairman and non-chairman nodes in FIG. 7 and all other non-chairman nodes. At the chairman atom, this message initiates a process for assuring that messages received for and generated by the chairman atom have correct addresses for the left and right siblings for certain messages. An Index Node Added message 150 in FIG. 6 indicates that a new index node is added and contains an index key, record identification and other information and an Index Node Removed message contains corresponding information concerning the removal of an index node. From the occurrence of the split in the chairman node in step 214 until the end of the splitting operation there exists the possibility that non-chairman nodes may not have processed the split. Each time one of these messages is received during this interval, messages received at the left sibling that should be processed on the right sibling are rebroadcast from the right sibling. Messages received at the right sibling are rebroadcast from the left sibling.

This process continues until the chairman receives Index Message Done messages from all the other nodes/atoms involved in the split operation. When this occurs, step 217 terminates the rebroadcasts of step 215 and broadcasts an Index Split Done message 161 to all the nodes with a copy of the index atom.

Figure 10:
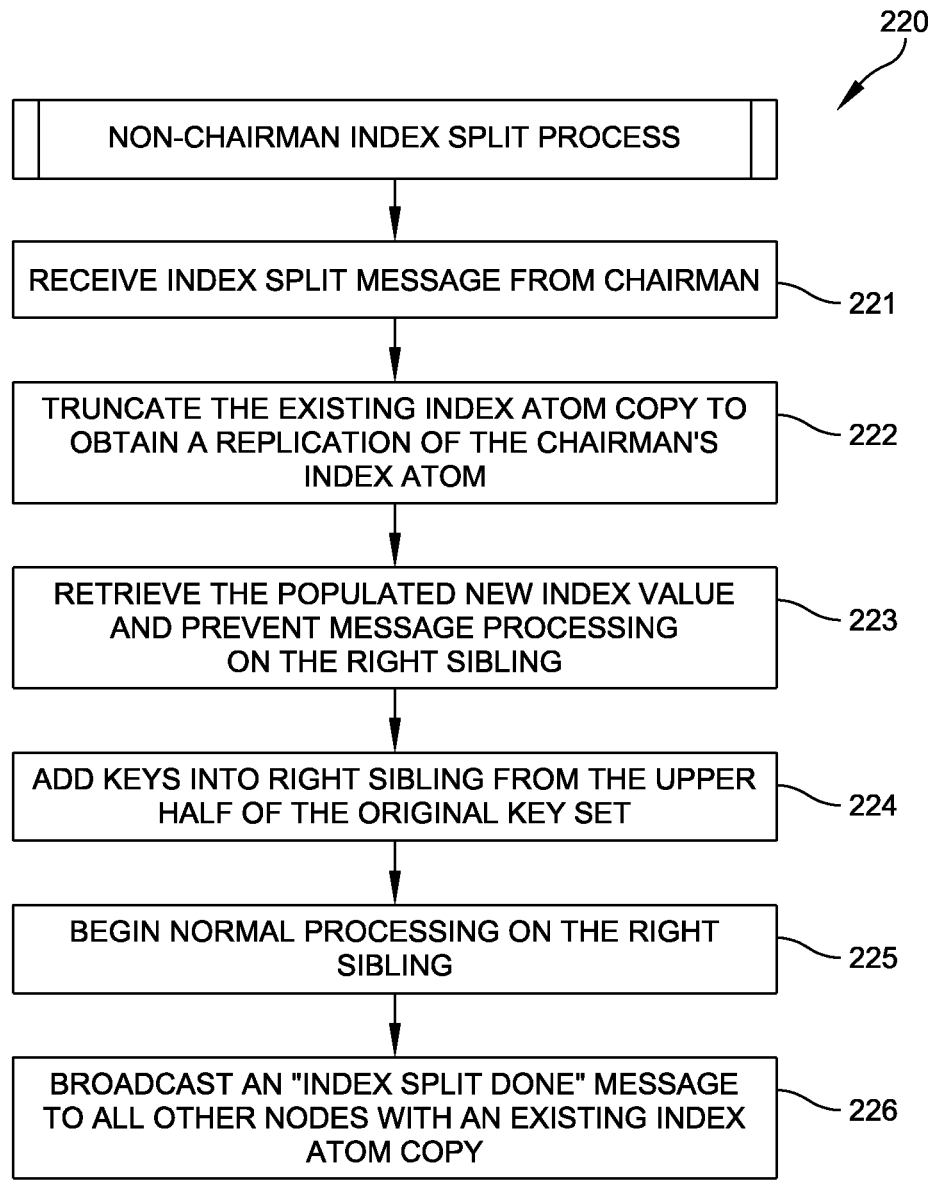
FIG. 10 is depicts an index split process of each non-chairman with a copy of the index atom being split.

When a non-chairman node receives an Index Split message from the chairman, an Index Split process 220 in FIG. 7 and shown in more detail in FIG. 10 begins. Each non-chairman node responds to that message by truncating its existing index atom 201N at step 222 to obtain a copy of the chairman's index atom as shown in FIG. 8C that becomes the left sibling of the new index atom. Step 223 obtains a copy of the populated new index 211C as shown in FIG. 8D which becomes the lower portion of the new index atom and prevents any processing on the keys from the right sibling.

Next step 224 "prunes" the right sibling by adding all its local keys from the upper portion copy 213N as also show in FIG. 8D. This occurs before allowing any message processing on the right sibling 213N and assures that all messages are processed against the same indexes as if no split had occurred. Next step 225 allows the non-chairman to begin to process any messages directed to it. Step 227 broadcasts an Index Split Done message to all the nodes with an existing index atom copy. This signifies that foregoing processing has been completed at the respective node.

Control then transfers from process 220 back to the chairman Index Split Process 214 shown in FIG. 9. Specifically as shown in FIG. 9, at this point the chairman broadcasts an Index Split Message to all of the nodes with an existing atom copy whereupon control transfers to a non-chairman tracked message process 230 as shown in FIG. 11.

Figure 11:
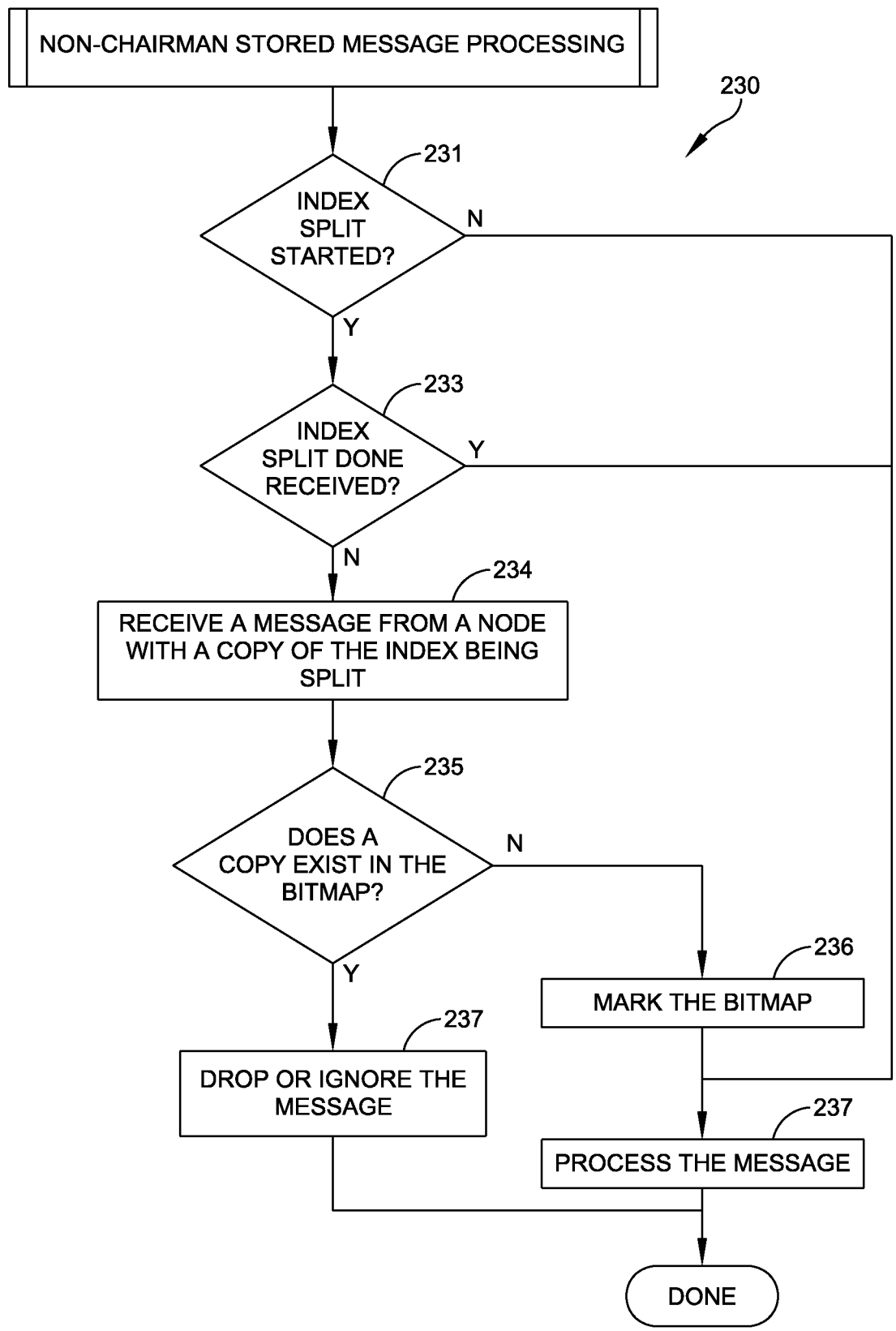
FIG. 11 is a flow diagram useful in understanding the processing of messages stored during a split operation.

Referring now to FIGS. 7 and 11, a stored message process 230 uses step 231 to divert control to step 232 to process each message received at that node for the index atom. When an Index Split Start message is received, step 231 diverts control to step 233 that responds to the receipt of the Index Split Done message in step 233. During the interval between these two messages, steps 231 and 233 divert control to step 234 to buffer each incoming message at step 234. Each message includes its atom ID, sender ID represented by a node number and a change number. If step 234 receives a first message or new message not previously received, step 235 diverts control to record the message in some manner, as by entry in a bit map at step 236. Then the message is processed. If step 235 determines that the bit map has recorded the receipt of that message from another node, control transfers to step 237 to drop or ignore the message because it is a duplicate. Consequently redundant processing does not occur.

As will now be apparent, this invention insures that an index in a distributed database can be split in a concurrent and consistent fashion even though copies of that index may exists at multiple nodes at which data processing occurs. This occurs without any need to quiesce the system so there is no significant performance degradation. Also this invention eliminates the involvement of nodes that do not include that specific index.

This invention has been disclosed in terms of certain implementations that are directed to a specific implementation of a distributed database. Although the invention is disclosed for in one specific implementation, the application to other implementations will be apparent to others without departing from the invention. Therefore, it is the intent of the appended claims to cover all such variations and modifications as come within the true spirit and scope of this invention.

What is claimed as new and desired to be secured by Letters Patent of the United States is:

1. A method of splitting a first index atom in a plurality of atoms in a distributed database, the distributed database comprising a plurality of nodes, each node in the plurality of nodes comprising a corresponding processor and a corresponding memory, one node in the plurality of nodes being designated as a chairman for the first index atom and including a chairman's instance of the index atom, the method comprising:

splitting, by the chairman, a portion of the chairman's instance of the first index atom into a chairman's instance of a second index atom;

broadcasting, by the chairman, an index split message to each node in the plurality of nodes including a corresponding instance of the first index atom;

receiving, at the chairman, a message to insert a key value into the second index atom;

rebroadcasting the message from the corresponding instance of the first index atom to a corresponding instance of the second index atom at each node in the plurality of nodes including the corresponding instance of the first index atom, the message causing each node in the plurality of nodes having a corresponding instance of the second index atom to insert the key value into the corresponding instance of the second index atom;

receiving, at the chairman, a split done message from each node in the plurality of nodes including a corresponding instance of the first index atom, the split done message indicating that a portion of the corresponding instance of the first index atom has been split into the corresponding instance of the second index atom;

in response to receiving the split done message from each node in the plurality of nodes including a corresponding instance of the first index atom, terminating, at the chairman, rebroadcasting the message; and broadcasting, by the chairman, an index split done message to each node in the plurality of nodes including a corresponding instance of the first index atom.

2. The method of claim 1, wherein splitting the portion of the chairman's instance of the first index atom further comprises:

selecting a split key value for the first index atom, the split key value defining a first set of key values in the first index atom and a second set of key values in the first index atom;

creating the chairman's instance of the second index atom; and moving the second set of key values from the chairman's instance of the first index atom to the chairman's instance of the second index atom.

3. The method of claim 2, wherein splitting the chairman's instance of the first index atom further comprises:

truncating the chairman's instance of the first index atom based on the split key value.

4. The method of claim 3, further comprising, at each node in the plurality of nodes including a corresponding instance of the first index atom:

deleting the second set of key values from the corresponding instance of the first index atom;

retrieving from the chairman the corresponding instance of the second index atom; and sending the corresponding split done message to the chairman.

5. The method of claim 1, wherein the index split message includes instructions from the chairman to each node in the plurality of nodes including the corresponding instance of the first index atom to split their corresponding instances of the first index atoms.

6. The method of claim 1, wherein the index split done message represents an acknowledgement indicating that the corresponding instance of the first index atom in each node in the plurality of nodes including the corresponding instance of the first index atom has been split.

7. The method of claim 1, wherein the chairman receives the message to insert the key value before receiving the corresponding split done message from each node in the plurality of nodes including a corresponding instance of the first index atom.

8. The method of claim 7, further comprising:

inserting the key value into the second index atom before the corresponding split done message is received from each node in the plurality of nodes including a corresponding instance of the first index atom.

9. The method of claim 8, further comprising determining if the message is a duplicate.

10. The method of claim 9, further comprising, in response to determining that the message is duplicate, dropping or ignoring the message.

11. The method of claim 7, wherein the chairman receives the message to insert the key value into the second index atom after splitting the portion of the chairman's instance of the first index atom.

12. A method of splitting an index atom in a plurality of atoms in a distributed database, the distributed database comprising a plurality of nodes, each node in the plurality of nodes comprising a corresponding processor and a corresponding memory, one node in the plurality of nodes being designated as a chairman for the index atom and including a chairman's instance of the index atom, the chairman's instance of the index atom representing data and/or metadata stored in the distributed database, the method comprising:

selecting a split key value for the index atom, the split key value defining a first set of key values in the source atom and a second set of key values in the target atom;

creating, by the chairman, a chairman's instance of a target atom;

moving the second set of key values from the chairman's instance of the index atom to the chairman's instance of the target atom;

transmitting, by the chairman to at least a subset of nodes in the plurality of nodes, instructions to split the index atom, each node in the at least a subset of nodes including a corresponding instance of the index atom;

splitting, by a first node in the at least a subset of nodes, a first instance of the index atom into a first instance of a source atom and a first instance of a target atom;

transmitting, from the first node to the chairman, an acknowledgement indicating that the first instance of the index atom has been split;

receiving, at the chairman, a message to process a record associated with a key value in the second set of key values before receiving the acknowledgement at the chairman;

rebroadcasting the message from the chairman's instance of the source atom to the chairman's instance of the target atom and/or from the first instance of the source atom to the first instance of the target atom;

terminating the rebroadcasting after the chairman receives the acknowledgement; and transmitting, from the chairman to the at least a subset of nodes, a message indicating the index atom has been split.

13. The method of claim 12, wherein splitting the chairman's instance of the index atom further comprises:

truncating the chairman's instance of the source atom at the split key value.

14. The method of claim 13, wherein splitting by the first node the first instance of the index atom further comprises:

deleting the second set of key values from the first instance of the source atom; and retrieving, from the chairman, the first instance of the target atom.

15. The method of claim 12, wherein the acknowledgement comprises an index split done message indicating that a corresponding instance of the index atom has been split.

16. A method of splitting a first index atom in a plurality of atoms in a distributed database, the distributed database being distributed over a plurality of nodes, each node in the plurality of nodes comprising a corresponding processor and a corresponding memory, each atom in a plurality of atoms containing a specific fragment of the data and/or metadata, the plurality of atoms collectively representing all the data and/or metadata in the distributed database, one node in the plurality of nodes including a first copy of the first index atom and being designated as a chairman for the first index atom, the method comprising:

at the chairman:
- splitting the first copy of the first index atom into a first copy of a pair of siblings;
- transmitting, to other nodes in the plurality of nodes, instructions to split respective local copies of the first index atom, the respective local copies of the first index atom being replicas of the first copy of the first index atom on the other nodes;
- rebroadcasting a message involving the first index atom received at one sibling in the pair of siblings from the other sibling in the pair of siblings;
- receiving, from the other nodes in the plurality of nodes, respective acknowledgements that the respective local copies of the first index atom have been split;
- in response to receiving the respective acknowledgements, terminating the rebroadcasting of the message involving the first index atom; and
- broadcasting a split done message to the other nodes in the plurality of nodes, the split done message indicating that the respective local copies of the first index atom have been split;

at each of the other nodes in the plurality of nodes:
- splitting, by the other nodes in the plurality of nodes, the respective local copies of the first index atom into respective copies of the pair of siblings in response to the instructions to split the respective local copies of the first index atom; and
- transmitting, from the other nodes in the plurality of nodes to the chairman, the respective acknowledgements that the respective local copies of the first index atom have been split; and at a first node in the plurality of nodes:
- receiving the message involving the first index atom before receiving the split done message from the chairman;
- determining whether a copy of the message exists in a bit map;
- upon determining that the copy of the message exists, dropping or ignoring the message;
- upon determining that the copy of the message does not exist, entering the message to the bit map; and
- processing the message before receiving the split done message from the chairman.

17. The method of claim 16, wherein receiving the message involving the first index atom at the first node in the plurality of nodes occurs after the first index atom receives the instructions to split respective local copies of the first index atom from the chairman and before the first index atom receives the split done message from the chairman.

* * * * *